May 10, 1955   A. C. CURTIS   2,707,934
PIPE LINE TREATING PLUG
Filed Jan. 22, 1953
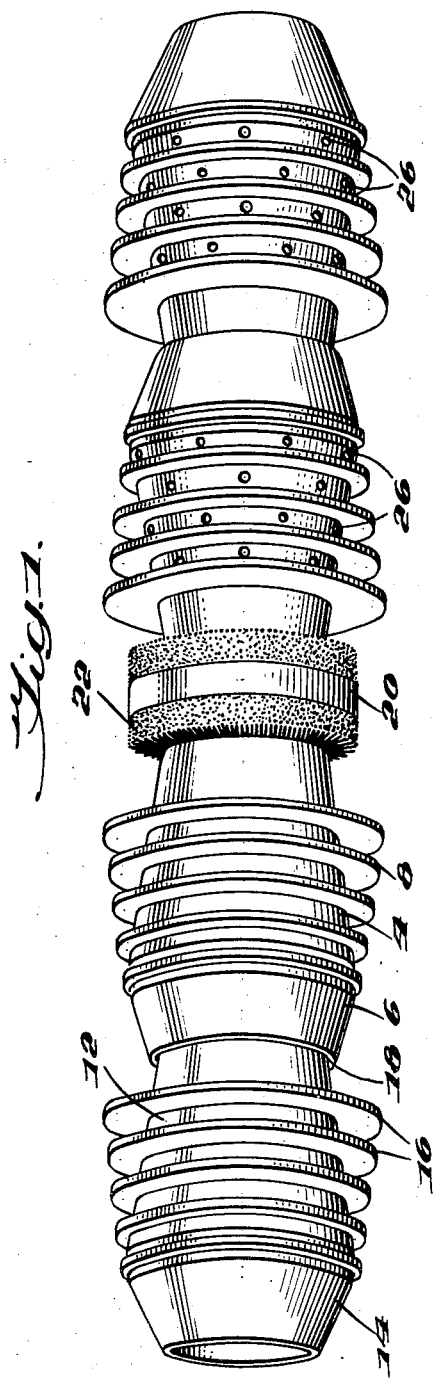
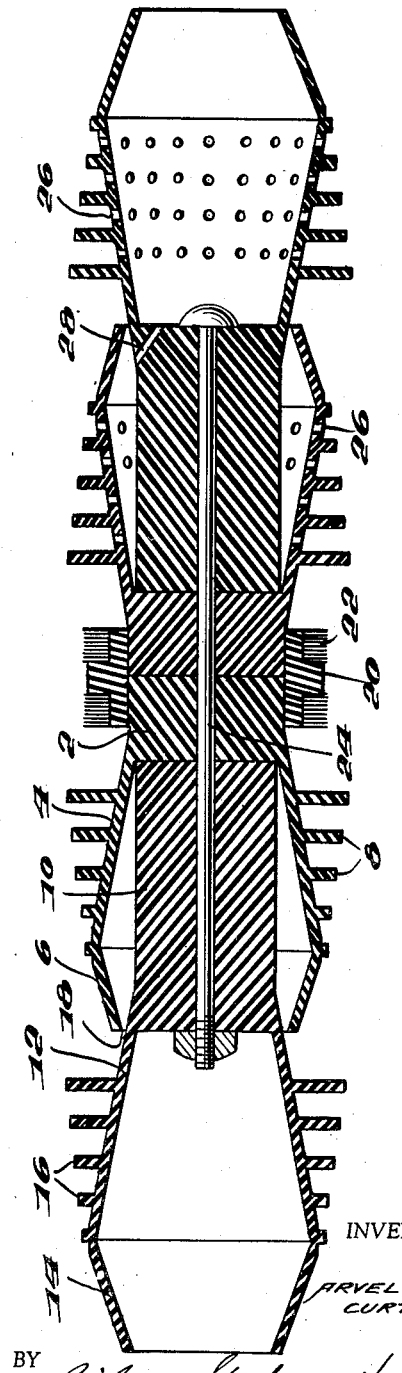
INVENTOR
ARVEL C. CURTIS,
BY
ATTORNEYS

United States Patent Office 2,707,934
Patented May 10, 1955

2,707,934

PIPE LINE TREATING PLUG

Arvel C. Curtis, Odessa, Tex., assignor to Pipelife, Inc., a corporation of Texas Application January 22, 1953, Serial No. 332,740

17 Claims. (Cl. 118—408)

The invention relates to a plug for use in treating the interior of tubular bodies, particularly pipe lines, and more especially to a plug used in applying a coating to the interior of pipe lines already laid in the ground.

The patent to Curtis and Tomlinson, No. 2,480,358, describes a system for coating the interior of pipe lines, in which a body of paint or other coating material is propelled through the line by confining it between two plugs and pushing the plugs through a section of line by controlled fluid pressure. The plugs shown in that patent are quite satisfactory under ordinary conditions. However, for certain types of work they are not entirely perfect. In the first place, they are not always sufficiently flexible to go around sharp curves in the line. Second, where there are obstructions in the line, such as internal collars at the joints, or where, as sometimes happens, the line is formed of pipe sections of somewhat varying diameters, the plugs may hang up in the line and either fail to move or be torn up when they are moved.

The primary object of the present invention is to provide a plug which overcomes the disadvantages of the prior plug, and which can be successfully used even under exceptional circumstances.

Another object of the invention is to provide a plug which is more flexible than the former plug and which can therefore be used even in lines having relatively sharp bends therein, while accomplishing a thorough coating job at such bends.

A further object of the invention is to provide a plug which is not as likely to hang up in the line or to be damaged by obstructions therein as the former plug.

Still another object of the invention is to provide a plug which is more adequate in leaving an even coating of the desired thickness on the interior of the line.

Still a further object of the invention is to provide a plug which can be readily driven in either direction through the pipe line.

Further objects and advantages of the invention will appear more fully from the following description, especially when taken in conjunction with the accompanying drawings which form a part thereof.

In the drawings:

Fig. 1 shows in side elevation a plug embodying my invention; and

Fig. 2 is a longitudinal cross-section therethrough.

The plug in its preferred form is in two oppositely directed parts, which are identical except for the holes to be described hereinafter. Each part is composed of two members formed of an elastic material such as rubber. The inner member includes a solid body part 2, an outwardly flaring extension 4 forming a flange and, at the outer end of such extension, an inwardly tapering part 6. On the outside of extension 4 are annular ribs 8, the outside diameters of these ribs increasing from the outer end of the extension towards the base thereof, or decreasing with increasing distance from the center of the plug.

The second or outer member on each side has a solid body part 10 preferably somewhat longer than the body part 2, which fits within the flanges 4, 6 and abuts at its base against portion 2. This body part also has an outwardly flaring flange 12, an inwardly tapering end 14 and annular ribs 16 similar to ribs 8.

Inwardly tapering flange 6 is of such length as to leave a space 18 between its free edge and the outwardly tapering flange 12.

Around the abutting ends of the body parts 2, at the center of the plug, is elastic ring 20 of T-shaped cross-section carrying brush parts 22. The outer diameter of the ring and brushes is about equal to that of the greatest diameter of flanges 4 and 12. A bolt 24 extends through central holes in the body parts 2 and 10 so as to hold all the parts of the plug together.

In the flanges 4 and 12 on one side of the center of the plug are provided holes 26 which open from the interior of the flanges into the spaces between ribs 8, 16 to admit coating material from the interior of the flanges into such spaces. Holes 28 in body portion 10 also allow paint to flow from the interior of flange 12 into the interior of flange 4.

The plug is used in general in the manner described in the Patent No. 2,480,358 referred to above, or as shown in my application for Method of Coating the Interior of Pipe Lines, Serial No. 332,739, filed January 22, 1953. In this procedure, two of the plugs are inserted into a pup joint connected to one end of the pipe line, with the ends having the holes in the flanges facing inwardly towards each other. Paint or other coating material is then forced into the space between the plugs, pushing the forward plug into the line. After removal of any air from between the plugs, air under pressure is introduced behind the rear plug and the unit is forced through the line, leaving a layer of coating material on the inside wall.

The holes 26 allow the paint to enter into the compartments between the ribs 8, 16 where it is pressed against the pipe wall. The ribs on the rear parts of the plug will then distribute this paint evenly and in a smooth, uniform coat on the pipe walls.

If several thicknesses of coating are to be applied, the plugs can be reversed at the end of their run and sent back through the line.

Because of its flexibility, this plug can pass around fairly sharp turns in the line and leave a good coating behind. Also, by reason of the inwardly tapering flanges 6, 14 there is little danger that the plug will hang up in the line on any obstructions.

Preferably the greatest cross-section of parts 4, 12 is substantially equal to the internal diameter of the pipe to be painted, while the innermost ribs are of somewhat greater diameter. However, the outermost rib is not high enough to cause closure of space 18 when the plug is inserted in the line. For example, for a four inch pipe, the diameter of the outermost ribs at the free ends of flanges 4, 12 might be four inches, while the diameter of the innermost ribs, near the bases of the flanges, might be four and three-eighths inches.

The plugs herein described, or similar plugs without the holes 26, 28 can be used effectively in cleaning of pipe lines prior to painting. Also, the plugs can be used for coating the interior of any elongated hollow object, whether under or above the ground, and whether horizontal, vertical or sloping.

While I have described herein one embodiment of my invention, I wish it to be understood that I do not intend to limit myself thereby except within the scope of the claims hereto or hereinafter appended.

I claim:

1. A plug for treating the interior of pipes comprising a main body portion having an outwardly flaring elastic flange extending from each end thereof, and annular elastic ribs on said flanges, the outer diameters of the ribs on each flange decreasing with increasing distance from the body portion.

2. A plug as claimed in claim 1 having holes through one of the flanges into the spaces between the ribs.

3. A plug as claimed in claim 2 having inwardly tapering elastic extensions on the ends of the flanges.

4. A plug as claimed in claim 1 having inwardly tapering elastic extensions on the ends of the flanges.

5. A plug for treating the interior of pipes comprising a main body portion having at least two outwardly flaring elastic flanges on each side of the center portion thereof, and elastic annular ribs on said flanges, the outer diameters of the ribs on each flange decreasing with increasing distance from the body portion.

6. A plug as claimed in claim 5 having holes through those flanges on one side of the center into the spaces between the ribs.

7. A plug as claimed in claim 6 having inwardly tapering elastic extensions on the ends of the flanges.

8. A plug for treating the interior of pipes comprising a main body portion having at least two outwardly flaring elastic flanges on each side of the center portion thereof, and inwardly tapering elastic extensions on the ends of the flanges.

9. In a plug as claimed in claim 8, the inwardly tapering extensions on the flanges nearest the center terminating short of the outwardly flaring flanges further from the center to leave a space therebetween.

10. A plug for treating the interior of pipes comprising a pair of members of elastic material having solid parts abutting against each other and having at their opposed ends outwardly flaring hollow extensions, and a second pair of members of elastic material having solid parts extending within said flared extensions and abutting against the solid parts of the first pair of members and having outwardly flaring hollow extensions, and means securing the four members together, said plug having inwardly tapering extensions on the ends of the outwardly flaring extensions.

11. In a plug as claimed in claim 10, the inwardly tapering extensions on the first pair of members terminating short of the outwardly flaring extensions on the first pair of members to leave a space therebetween.

12. A plug as claimed in claim 11 having annular ribs on the outwardly flaring extensions, the outer diameters of the ribs on each extension decreasing with increasing distance from the center of the plug.

13. A plug as claimed in claim 12 having holes through the outwardly flaring extensions on one side of the center of the plug into the spaces between the ribs.

14. A plug as claimed in claim 13 in which the second member having holes through the outwardly flaring extension thereof also has a hole through the solid part connecting the interior of the hollow extension with the outside of the solid part.

15. A plug for treating the interior of pipes comprising a pair of members of elastic material having solid parts abutting against each other and having at their opposed ends outwardly flaring hollow extensions, and a second pair of members of elastic material having solid parts extending within said flared extensions and abutting against the solid parts of the first pair of members and having outwardly flaring hollow extensions, and means securing the four members together, said plug having annular ribs on the outwardly flaring extensions, the outer diameters of the ribs on each extension decreasing with increasing distance from the center of the plug.

16. A plug as claimed in claim 15 having holes through the outwardly flaring extensions on one side of the center of the plug into the spaces between the ribs.

17. A plug as claimed in claim 16 in which the second member having holes through the outwardly flaring extension thereof also has a hole through the solid part connecting the interior of the hollow extension with the outside of the solid part.

References Cited in the file of this patent

UNITED STATES PATENTS

| | | |
|---|---|---|
| 1,796,338 | Moore | Mar. 17, 1931 |
| 2,214,261 | Roth | Sept. 10, 1940 |
| 2,480,358 | Curtis et al. | Aug. 30, 1949 |